July 2, 1968     B. RUNANIN     3,390,481
PUPPET AND ANIMATION DEVICE
Filed April 6, 1965     8 Sheets-Sheet 1
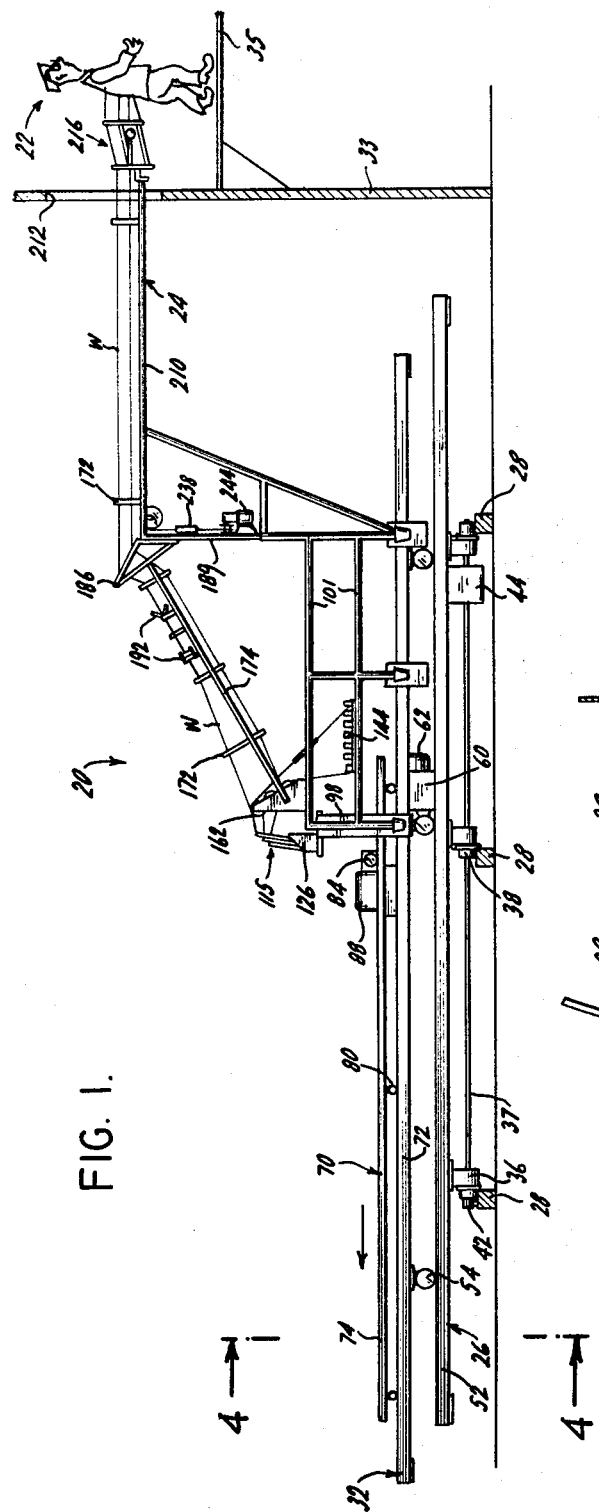
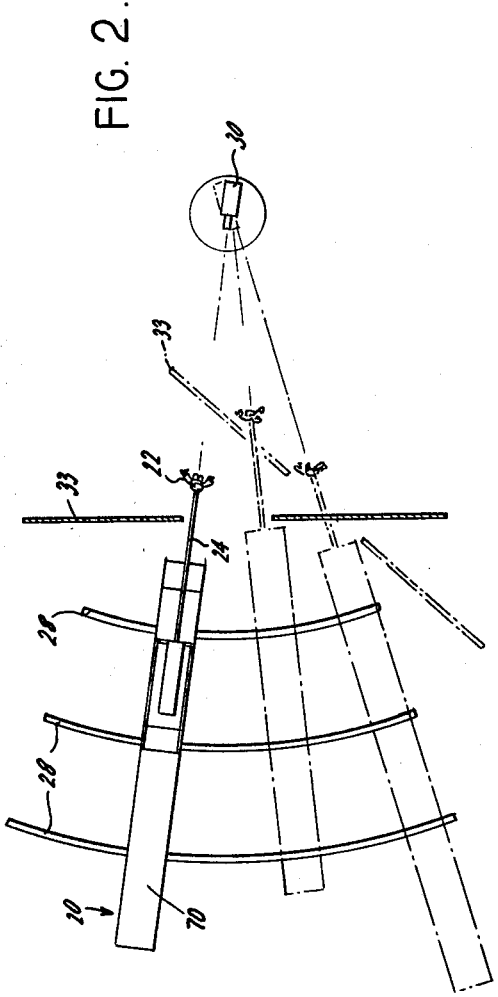
INVENTOR.
BORIS RUNANIN
BY
Amster & Rothstein
ATTORNEYS

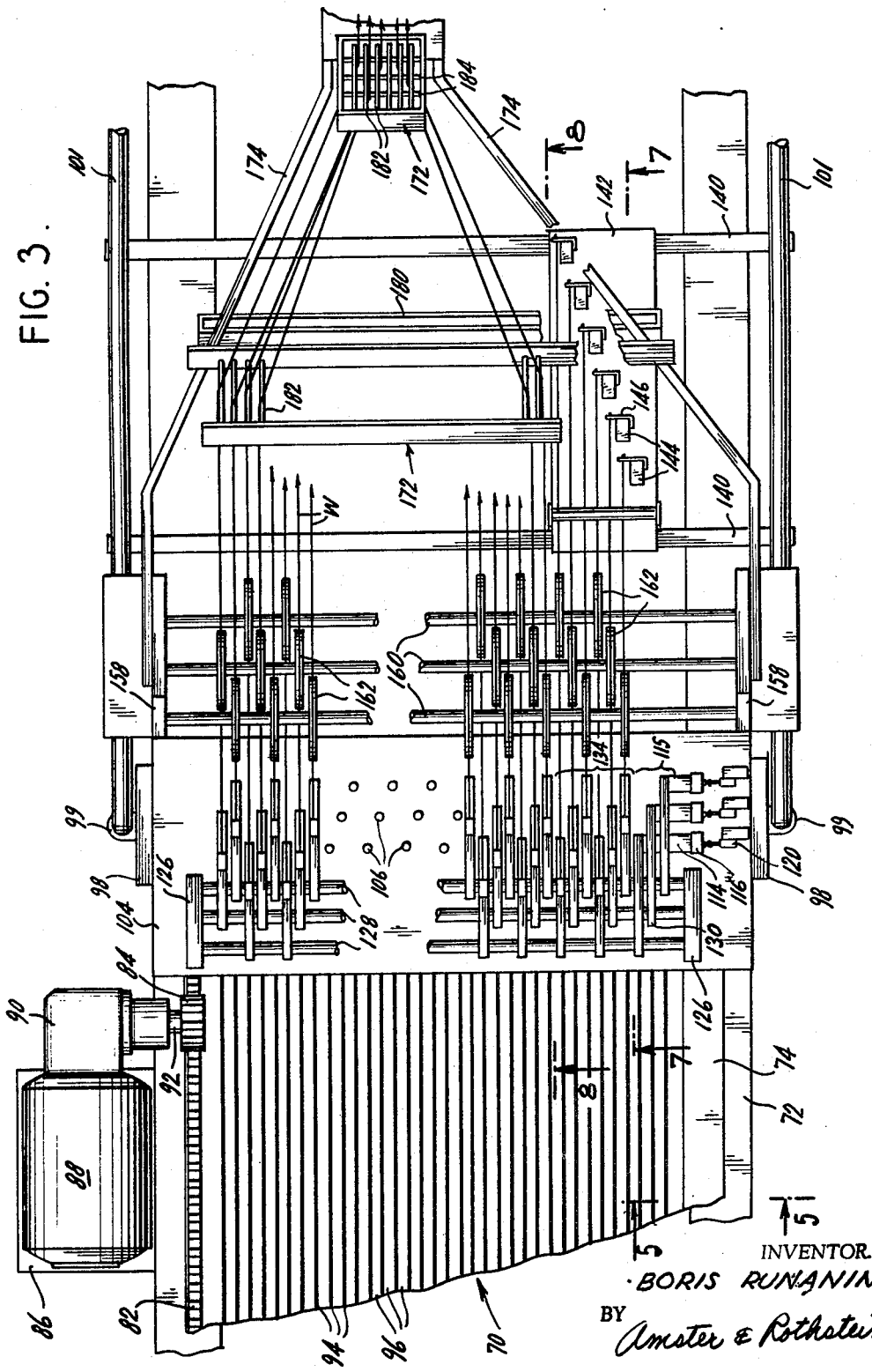

July 2, 1968  B. RUNANIN  3,390,481
PUPPET AND ANIMATION DEVICE
Filed April 6, 1965  8 Sheets-Sheet 3

INVENTOR.
BORIS RUNANIN
BY
Amster & Rothstein
ATTORNEYS

July 2, 1968  B. RUNANIN  3,390,481
PUPPET AND ANIMATION DEVICE
Filed April 6, 1965  8 Sheets-Sheet 4

INVENTOR.
BORIS RUNANIN
BY Amster & Rothstein
ATTORNEYS

July 2, 1968  B. RUNANIN  3,390,481
PUPPET AND ANIMATION DEVICE
Filed April 6, 1965  8 Sheets-Sheet 5
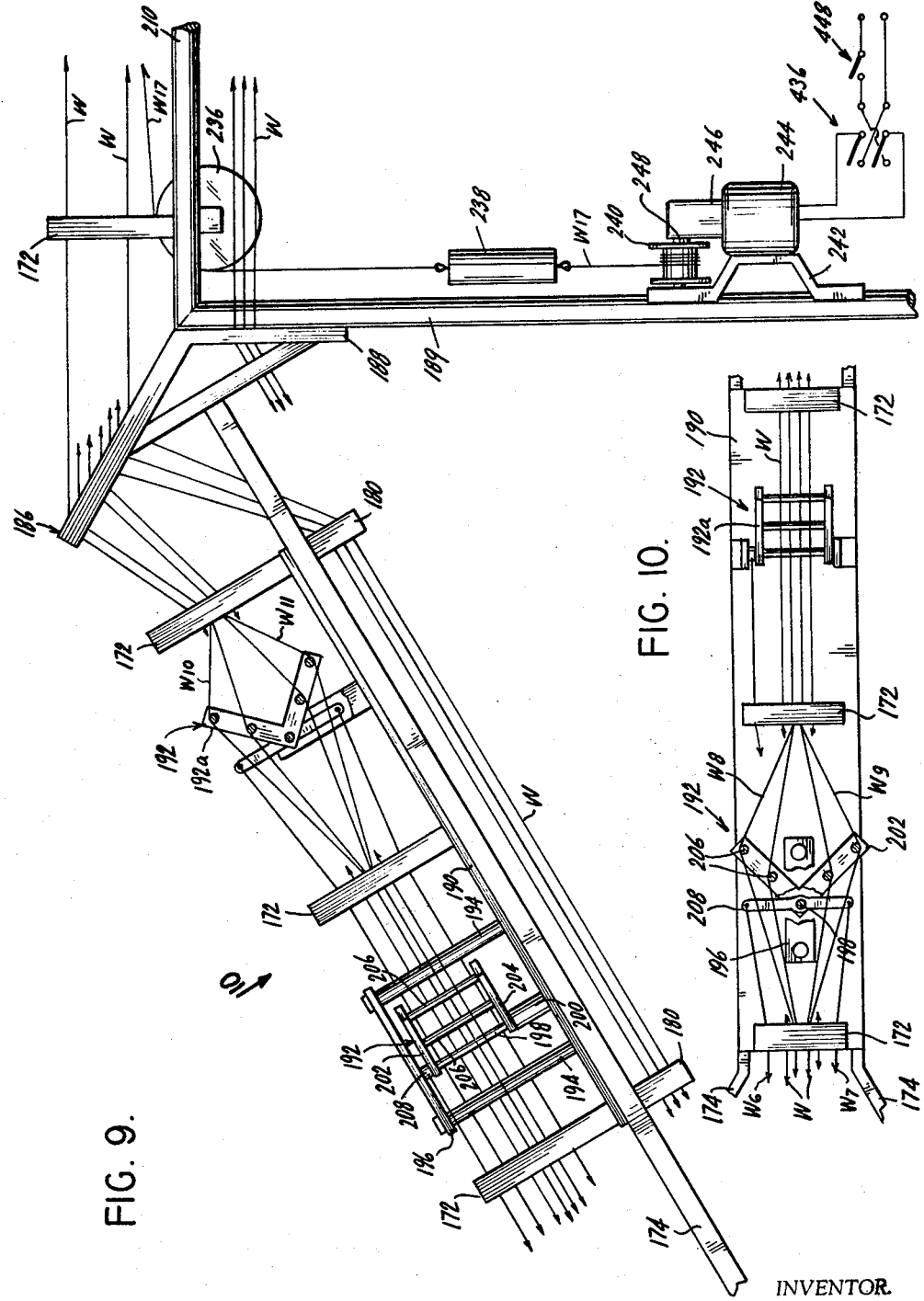
INVENTOR.
BORIS RUNANIN
BY 
ATTORNEYS INVENTOR.
BORIS RUNANIN
BY Amster & Rothstein
ATTORNEYS July 2, 1968

B. RUNANIN 3,390,481

PUPPET AND ANIMATION DEVICE

Filed April 6, 1965

July 2, 1968 B. RUNANIN 3,390,481
PUPPET AND ANIMATION DEVICE
Filed April 6, 1965 8 Sheets-Sheet 8

INVENTOR.
BORIS RUNANIN
BY Amster & Rothstein
ATTORNEYS

United States Patent Office 3,390,481
Patented July 2, 1968

3,390,481
PUPPET AND ANIMATION DEVICE
Boris Runanin, 160 W. 73rd St.,
New York, N.Y. 10023
Filed Apr. 6, 1965, Ser. No. 445,960
9 Claims. (Cl. 46—126)

ABSTRACT OF THE DISCLOSURE

In a puppet animation device, a movable stringed puppet mounted on an end of a boom such that the puppet masks the presence of both the boom and the puppet-manipulating strings supported thereon, and wherein the boom is limited to rotative movement about a vantage point which is also at the center of the rotative movement so that at each position of rotative movement of the boom the puppet continues to mask the presence of the boom from a viewer standing at the vantage point.

---

The present invention relates generally to a puppet and to an animation device for producing animation of a puppet, and more particularly to a combination apparatus of said puppet and said animation device.

The apparatus of the present invention is particularly useful in the production of animated films or the like, used as cartoons, commercials, etc., and is also used, but to a lesser degree in the rendition of live performances of a puppet or similar animated figure or object. In these or other such end-uses, said apparatus is employed to produce animation of a puppet associated with and forming an integral part of said apparatus. Thus, in a typical working environment for said apparatus, the degree of effectiveness of such apparatus, as well as of prior art puppet-animating apparatus, is of necessity related to the degree of realism of the puppet movements and also to the ability to mask or hide any trace of the animation device which produces said movements. Thus, the puppet per se must have constructural features providing the widest possible range of articulating movement for realistically simulating human movement during puppet animation or action. However, in an instance such as is contemplated herein, where a mechanical device is provided to produce puppet animation, to the extent that such articulating degrees of movement are provided in the puppet and control is exercised over such movement, the construction and mode of operation of said mechanical or animation device are seriously complicated. It is thus difficult not only to provide an efficient and effectively operating animation device, but also to mask or hide the presence of said animation device in a typical working environment or set-up with the puppet.

With regard to both mode of operation and construction of currently available prior art combination puppet and animation devices, there is much to be desired. Generally, the degrees of articulating movement of the puppet of such prior art combination apparatus is severely limited in order to simplify the mode of operation and construction of the animation device associated therewith. Thus, the best of these prior art combination apparatus have serious drawback and limitations.

Broadly, it is an object of the present invention to overcome the foregoing and other shortcomings of the prior art. Specifically, it is an object to provide a combination apparatus of a puppet and an animation device for mechanically producing movement in said puppet, wherein puppet movements are practically limitless and said animation device is at all times effectively masked from view.

Another object of the present invention is to provide a puppet having constructural features for producing a wide range of articulating degrees of movement and which puppet nevertheless is readily operatively associated with and controlled by an animation device. In this connection, said animation device produces and controls this wide range of puppet movement without requiring a complicated construction which cannot at all times be masked from view by the puppet.

Still another object of the present invention is to provide an animation device compatible with the operation of a puppet through a multitude and wide range of animation movements and which effectively exercises not only control over and produces each of said movements per se, but also regulates said movements in relation to each other. In this connection, the movable parts of the puppet are manipulated by wires and a position of movement, as for example, of a hand is unavoidably affected by other movements, as for example, a major or overt body movement. Thus, an important constructural aspect of the animation device herein relates to appropriate mechanisms for permitting overt body movements without adverse effect on other puppet movements, particularly of the limb-members of the puppet.

A still further object of the present invention relates to a combination puppet and animation device which effectively and efficiently produces animation of said puppet not only as regards the path and extent of puppet limb-member and body movement, but also in regard to the tempo or speed of such movement.

An animation device demonstrating features of the present invention includes a boom supporting said puppet on one end thereof for presentation with particular reference to a specific remote vantage point. In the production of animated film, a camera is advantageously located at said vantage point for taking motion pictures of the puppet. A dolly is employed for mounting the other end of said boom and is restricted to movement through a path limited to rotation about said remote vantage point whereby at all positions of movement of said puppet, the boom supporting the same is effectively masked from view by the puppet. Additionally, a movement-producing mechanism is carried on said dolly and is provided with an operative connection to each of the strings or wires which are connected at their respective opposite ends to the movable parts of said puppet. Slack take-up and play-out means are carried on the boom and are operable during puppet animation or action for both guiding and maintaining said wires taut between said movement-producing mechanism and said puppet.

Intended for use particularly with the foregoing animation device, but having utility independently thereof, is an articulating puppet demonstrating features of the present invention and including a skeletal body provided with the usual limb-members of arms and legs, and movable body sections. More particularly, said limb-members and body sections are movable relative to each other both in rotation and also in tilting traverses about a pivot axis for providing the necessary degrees of articulating movement to the puppet to effectively simulate a wide range of human movements. An essential aspect of the construction of said puppet skeletal body is a medial body section fixedly mounted on the boom of said animation device and consequently not having any movement independently of the movement of said boom. Notwithstanding this, however, a profile view of said puppet is effectively simulated by causing a rotative movement in the upper and lower body sections adjacent to said stationary medial body section. Appropriate outer clothing on said skeletal body effectively masks the stationary character of said medial body section while being appropriately turned to a profile perspective by rotative movement of said adjacent movable body sections. The medial body section additionally serves as a conduit through which the movement-producing wires are introduced into and distributed throughout the puppet to their respective operative points of connection at strategic locations throughout said puppet body and on the limb-members thereof for causing rotative and pivotal movements thereof. More particularly, said puppet body sections and limb-members thereof are provided with centrally located openings which are in registration with each other for accommodating the threading of said puppet wires along an internal course to said plural operative connections, wherein said movement producing wires are effectively hidden from view.

The above brief description, as well as further objects, features and advantages of the present invention, will be more fully appreciated by reference to the following detailed description of a presently preferred, but nonetheless illustrative embodiments in accordance with the present invention, when taken in conjunction with the accompaying drawings, wherein:

FIG. 1 is a elevational view of a combination apparatus of puppet and animation device demonstrating features of the present invention;

FIG. 2 is a diagrammatic plan view of said combination apparatus puppet and animation device in which the arcuate path of said animation device in relation to a remote vantage or filming point is best illustrated;

FIG. 3 is a partial plan view, on an enlarged scale, of the movement-producing mechanism of said animation device;

FIG. 9 is a fragmentary elevational view of a bridge section of the boom of said animation device;

FIG. 10 is a fragmentary plan view projected from FIG. 9, taken in the direction of the arrow 10, illustrating further details of construction of said bridge section and particularly of the slack control devices thereon;

Figure 4:
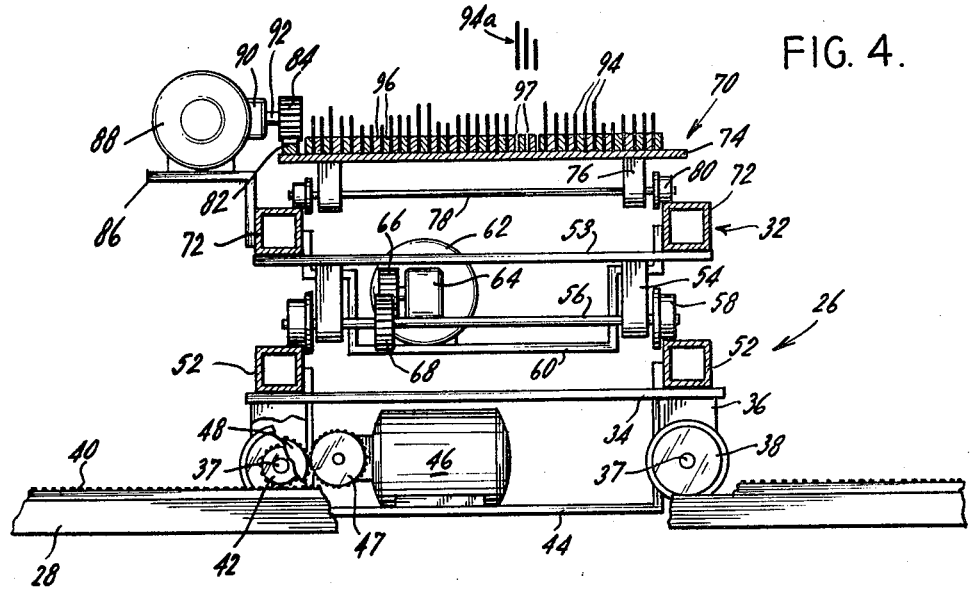
FIG. 4 is an end elevational view, in section taken on line 4—4 of FIG. 1, illustrating details of construction of the dolly of said animation device and of the bank of cams for the motion-producing mechanism of said device.

Reference is made to the drawings, and in particular to FIGS. 1, 2 in which there is shown an animation device, generally designated 20, which demonstrates features of the present invention. Device 20 is useful in producing animation in a stringed puppet 22 mounted on one end of the device, and includes a boom 24 which supports the puppet 22, and a dolly 26 for moving the boom 24. As is best shown in FIG. 2, a series of spaced arcuate tracks 28 are provided having a center at a fixed vantage point A from which the stringed puppet 22 is viewed to confine the dolly 26 to a limited rotative path of movement about said fixed vantage point A. A camera herein generally designated 30, is advantageously located at said vantage point A for taking motion pictures of the puppet 22, and being confined to pivotal movement about an axis through said vantage point A the boom 24 which supports the stringed puppet 22 is at all times hidden from the view of said camera 30. In addition to rotative movement of the dolly 26 along the tracks 28, said dolly includes a first carriage, generally designated 32 in FIG. 1, which is movable in opposite directions along the length of said dolly 26 towards and away from the pivotal camera 30 and which carriage actually mounts the boom 24. It is thus possible to produce a resultant movement in the puppet 22 which is a combination of the movement of the dolly 26 along the arcuate tracks 28 and of the carriage 32 along the length of said dolly 26. This puppet movement is illustrated by the full line and phantom perspective line illustrations of FIG. 2, and in practice is photographed against a scenic backdrop 33 of a stage 35.

As is best seen from a comparison of FIGS. 1 and 4, dolly 26 includes a body formed by spaced bracing members 34, from the underside and along opposite edges of which there are depending bearings 36 housing shafts 37 mounting flanged wheels 38 which cooperate with each of the rails 28. As is best shown in FIG. 4, on the rail 28 furthest from the camera 30, there is provided a rack 40 which is in meshing engagement with a pinion 42 rotatable with one of the flanged wheels 38 operating on this rail. At the opposite and forward end of the underside of the dolly body 34 is a motor 46 supported on a bracket 44 and which motor operates in a well known manner through a reduction gear train to drive a driving gear 47 which is in meshing engagement with a driven gear 48 fixedly mounted on an end of said shaft 37 mounting the pinion 42. In this manner, motor 46 is effective in driving pinion 42 along the rack 40 and causing movement of the dolly 26 along the arcuate tracks 28.

Still referring to FIG. 4, it will be seen that mounted upon and along opposite side edges of the dolly body 34 are a pair of spaced rails 52 along which said previously mentioned first carriage 32 is movable in opposite directions along the length of said dolly body 34. To this end, carriage 32 includes a carriage body also formed by spaced bracing members 53 on the underside and along opposite side edges of which are spaced sets of depending bearings 54 receiving therethrough horizontally oriented shafts 56. Journalled on the opposite ends of each shaft 56 is a pair of flanged wheels 58 which cooperate with the rails 52. A bracket 60 mounted on the underside of said carriage body 53 supports a motor 62 operating through a conventional gear reduction train 64 to drive a driving gear 66 in meshing engagement with a driven gear 68 fixedly mounted on one of the shafts 56, and in this manner motor 62 is effective in driving said first carriage 32 along the length of dolly 26.

Dolly 26 also includes a second movable member, herein generally designated 70, which more particularly is a movable bank of cams. Mounted upon and along opposite side edges of the first carriage 32 is another pair of rails 72. Dependent from a body member 74 of said cam bank 70 are cooperating pairs of bearings 76 which each receive shafts 78 mounting flanged wheels 80 which cooperate with said rails 72. A rack 82 is mounted upon and along one side of the cam bank 70 and is in meshing engagement with a pinion 84. A bracket 86 is welded or otherwise firmly secured to one of the rails 72 and on a horizontal leg thereof supports a motor 88 operating through a conventional reduction gear train 90 to drive said pinion 84 fixedly mounted on the motor shaft 92.

Cam bank 70 includes a plurality of cams, herein collectively designated 94, of varying heights and profiles to produce in an obvious and well understood manner prescribed movements in a movement-producing mechanism, subsequently to be described, which produces movement in the puppet 22 in response to the variations in height and contour of said cams 94. The individual members of the bank of cams 94 are arranged across the width of the cam bank body 74 in spaced relationship to each other, with spacing members, herein collectively designated 96, appropriately disposed between the individual cams of said cam bank. This is best illustrated in FIG. 4 by the three isolated cams, more particularly designated 94a, which in practice are mounted in the cam bank 70 by being disposed in a force fit in the longitudinal spaces 97 provided to receive said cams 94a.

Figure 5:
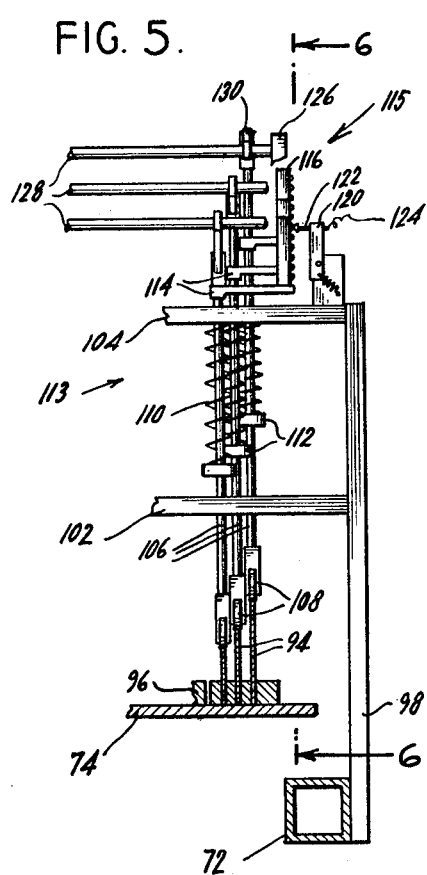
FIG. 5 is an elevational view, in section taken on line 5—5 of FIG. 3, illustrating further details of the construction of said motion-producing mechanism.

The mode of operation of the movable cam bank 70 in producing movements in the stringed puppet 22 can best be understood by a consideration of FIG. 3 in conjunction with FIGS. 5, 6, 7 and 8, to which figures reference is now specifically made. Mounted approximately at the middle of and straddling said first carriage 32 are a pair of upstanding frame members 98 which form part of the frame structure for a bridge section, herein generally designated 100, of the boom 24. As best shown in FIGS. 3, 5 (and FIG. 1) said upstanding members 98 are secured at their base, either by welding or other appropriate means, to each of the rail members 72 and have external protruding ears 99 thereon for mounting one end of each unit of a pair of side railings 101 of said boom bridge section 100. Additionally, said upstanding members 98 at their medial and upper ends thereof support a pair of spaced, horizontally oriented plate members 102, 104. These plates 102, 104 are provided with aligned, offset sets of openings, in each set of which is disposed a vertically oriented rod, herein collectively designated 106. On the base of each rod 106 is a conventional cam follower 108 which rides in a conventional manner along the profile of an individual cam 94 of the bank of cams 70. This operative association of cam follower 108 and cam 94 is maintained under the urgency of a helical spring 110 which is disposed about each of the rods 106 and is seated at one end against the underside of the upper plate 104 and at its other end against a collet 112 on the rod 106.

Figure 6:
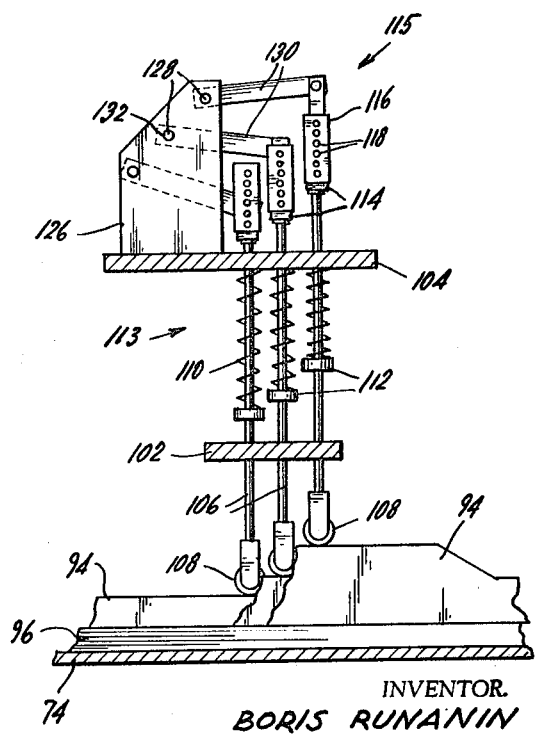
FIG. 6 is a further elevational view of said FIG. 5 equipment in section taken on line 6—6 of FIG. 5.

The cam rods 106 are part of a movement-producing mechanism, generally designated 113, of the animation device 20 herein, and said rods 106 of FIGS. 5 and 6 are more particularly of a sub-group 115 thereof which is exemplary of the manner in which the cams 94 are employed in the operation of the master control for said animation device 20, rather than in the actual production of movements in the movable parts of the stringed puppet 22. To this end, on each upper end of the rods 106 of FIGS. 5 and 6 is a horizontally oriented L-shaped bracket 114 on the free end of each of which is mounted an electrical component 116 having a vertically oriented series of electrical contacts collectively designated 118. Each component 116 has an associated cooperating component 120 which includes a contacting member 122 which selectively makes contact, depending on the height to which said component 116 is raised, with one of the electrical contacts 118. In this manner, one of a multitude of electrical circuits is completed through the conductors 124 connected to said component 116, each of said electrical circuits being effective to transmit a different electrical impulse to a master control for the device 20 for effecting a different mode of operation of said device. As best shown in FIG. 6, a pair of upstanding brackets 126 on the upper plate 104 (only one of which is shown in FIG. 6) supports three spaced horizontally oriented rods 128 on which a group of levers 130 are pivotally mounted at one end, as at 132, and which levers at their opposite ends are secured to the mounting brackets 114 to prevent rotation of the rods 106 within their mountings in the plates 102, 104.

Figure 7:
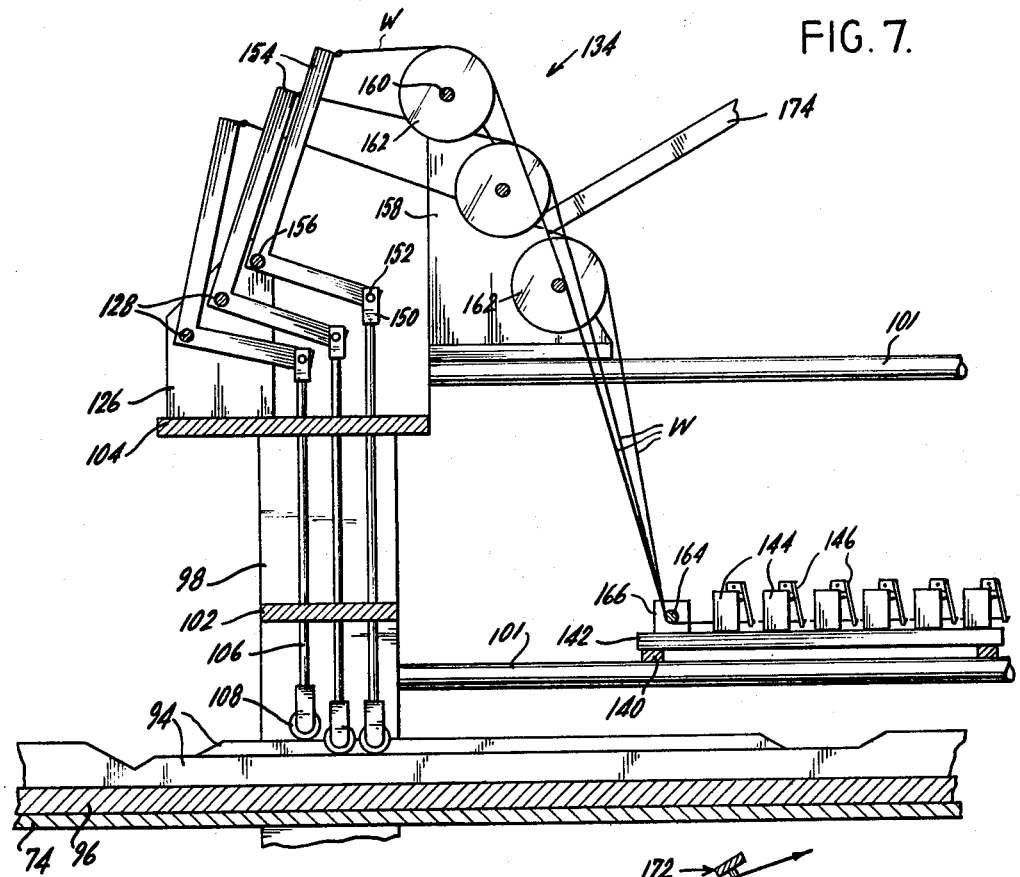
FIG. 7 is similarly an elevational view, in section taken on line 7—7 of FIG. 3, but of constructural features of said motion-producing mechanism which are exemplary of one mode of operation thereof.

Proceeding with the description of the movement-producing mechanism 113 of FIG. 3 and having particular reference now to additional FIG. 7, it will be seen that immediately adjacent to the sub-group 115 of said mechanism as exemplified by FIGS. 5 and 6, that there is another sub-group, more particularly designated 134, which it will be understood is also specifically employed to operate portions of the master control for the animation device 20 rather than the individual parts of the stringed puppet 22. However, the mode of operation of sub-group 134, unlike that of sub-group 115, employs string or wire manipulating and to this extent does not differ substantially from that which is employed to produce movements in the stringed puppet 22. As best shown in FIG. 3, at appropriate spaced intervals along the side railings 101 are braces 140, and straddling the two braces 140 shown in FIG. 3, is a shelf 142 on which there is provided a series of offset micro-switches 144 each having an actuating lever 146 which is operated by appropriate manipulation of a string or wire, herein collectively designated W, connected to each lever 146.

As best shown in FIG. 7, there is provided on the upper end of each of the cam rods 106 of the sub-group 134 a mounting fixture 150 for pivotally mounting, as at 152, one end of an L-shaped actuating lever 154. Each lever 154 is pivotally mounted at its heel, as at 156, on one of the plurality of previously described horizontally oriented rods 128, and at its other end is connected to a wire W which at its remote end is connected to one of the micro-switches 144. Mounted on an upper horizontal rail of the side railing 101 and at a point just forward of the bank of actuating levers 154 is a pair of upstanding brackets 158 mounting a series of axles or rods 160 on which a plurality of sheaves 162 are journalled for rotation. Each wire W connected between an actuating lever 154 and a micro-switch 144 is first threaded once around one of the interposed guiding sheaves 162 and thence under a horizontally disposed bar 164 mounted in blocks 166. Each wire W is then connected to a switch-lever 146 of a micro-switch 144. Thus, when a cam rise on one of the cams 94 is encountered, a vertical lifting movement is produced in one of the cam rods 106 and in turn produces pivotal movement in one of the cam actuated levers 154. Pivotal movement of said lever 154 will in turn result in actuation of one of the micro-switches 144 through pulling manipulation of the wire W connected between said actuating lever 154 and the switch lever 154 and the switch lever 146 of said micro-switch 144.

Figure 8:
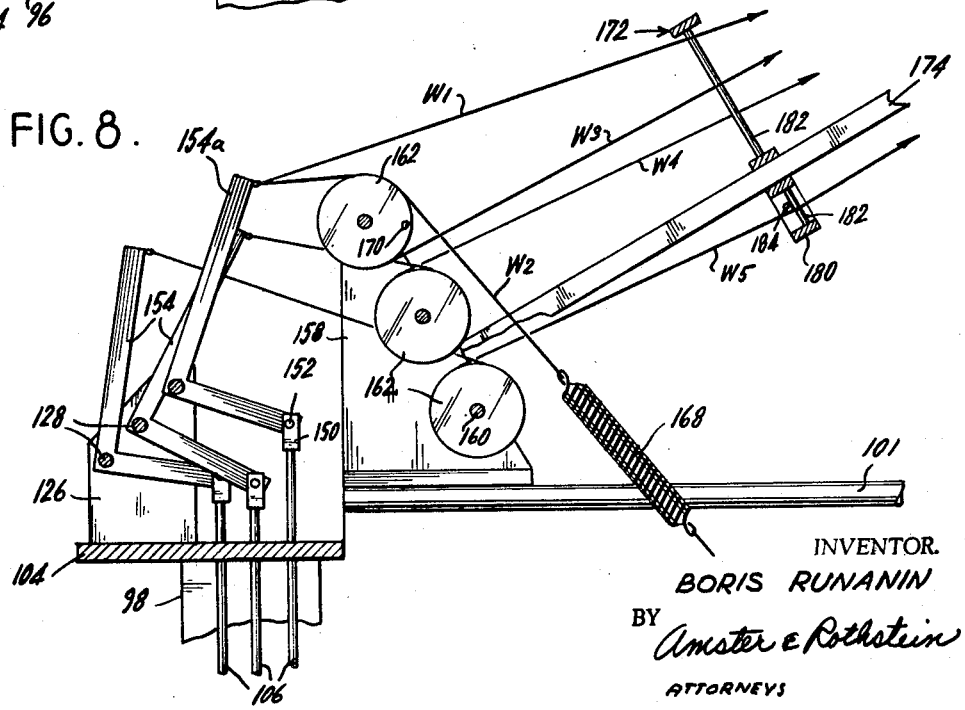
FIG. 8 is an elevational view similar to FIG. 7, in section on line 8—8 of FIG. 3, illustrating still another exemplary mode of operation of said motion-producing mechanism.

Reference is now made to FIG. 8 in which there are shown two exemplary methods of actuating wires W for producing animation in the moving parts of the stringed puppets 22. The cam actuated levers 154 and wire guiding sheaves 162 depicted in FIG. 8 will be understood to be located adjacent and inwardly of the previously mentioned sub-groups 115, 134. Taking the arrangement and connections for the first encountered cam actuated lever, which in FIG. 8 is more particularly designated 154a, it will be seen that one length of said wire W from its point of connection 166 to said lever 154a is extended therefrom in the lengthwise direction of the boom 24 for connection to a movable part of the puppet 22. A continuation of said wire, which in FIG. 8 is more particularly designated W1, is extended from said connection 166 once around the sheave 162 and is secured to one end of a return spring 168 which at its other end will be understood to be appropriately connected to the supporting frame structure for the boom 24 (see FIG. 1). At an appropriate point along the wrap around of wire W1 about the sheave 162, said wire W1 is connected, as at 170, to said sheave 162 so as to eliminate any slippage therebetween. Additionally a wire W2, which with wire W forms a cooperating set of movement producing wires for the puppet 22, is similarly connected to the sheave 162 at said connection point 170 and is extended therefrom along the boom 24 to its connection to the stringed puppet 22. Thus, for example, wire W may be employed to raise the arm of the puppet from a position of rest into a raised position and wire W2 employed to again subsequently return said arm to its original position of rest. Thus, in response to pivotal movement of lever 154a in a counter clockwise direction about its supporting rod 128, wire W is pulled in an appropriate direction to cause a raising of the puppet arm, while at the same time sheave 162 which mounts wire W2 is rotated in a counter clockwise direction producing a necessary play-out of wire W2 to permit this degree of movement in said puppet arm.

Return of the puppet arm to its original position occurs when a cam decline is encountered resulting in lever arm 154a rotating in a reverse clockwise direction, under the urgency of the return spring 168, and is produced by a corresponding clockwise rotation of the sheave 162. In response to this direction of rotation of the sheave 162, the wire W2 is then subjected to pulling manipulation to return said puppet arm to its original position, while the wire W at this time is appropriately played-out to accommodate this arm movement.

Still referring to FIG. 8, there is shown therein still another exemplary manner in which control is maintained over cooperating sets of wires which are employed to produce animation in a moving part of the stringed puppet 22. More particularly, this is illustrated by the wires W4, W5 which are independently connected between the movable part of the puppet 22 at one end, and at the other end as illustrated in FIG. 8, are connected to separate levers 154. Both wires W4, W5 are first wrapped once around a separate sheave 162. This mode of animation control contemplates complementary movement of the separate levers 154 in response to a rise and a decline in the profiles of cams 94 associated with said levers to produce opposing pivotal movements of said levers to manipulate said wires W4, W5. Thus, the manipulation of the cooperating set of wires W4, W5 to produce movement in the stringed puppet 22 from an at-rest position to a position of animation and back to said at-rest position is entirely under the control of the cams 94, as distinguished from the operation of the previously described wires W, W2, wherein the return to the at-rest position is under the control of a spring, such as is exemplified by return spring 168.

Whether entirely cam actuated or whether wire manipulation is in part controlled by springs, all of the wires W emanating from the movement-producing mechanism 113 and extending to the stringed puppet 22 follow a closely guided path paralleling the boom 24. Along this path, all the wires W are maintained in taut condition so that pulling manipulation is effective at the puppet end in producing movements in the puppet 22. With particular reference to FIGS. 3, 8, it will be seen that immediately forward of the bank of sheaves 162 that the wires W are threaded through a first guiding member or grating 172. Grating 172 is more particularly a part of the bridge section 100 of the boom 24 and is supported across a pair of converging frame members 174. As best shown in FIGS. 1, 9, grating 172 is one of several similarly designated wire guiding members which are supported along the length of the frame members 174. As best shown in FIG. 3, these gratings 172 may take one of two forms. In one form, the grating 172 includes a set of upper and lower frame members 176, 180 which each mount a series of spaced vertical guiding bars 182 about which the wires W are threaded in being extended to the stringed puppet 22. The spacing of the bars 182 is such as to guide the wires W into a more compact arrangement for ease of handling. After the first encountered grating 172 of FIG. 3, the compact arrangement of wires W is threaded through a second grating 172 which in addition to vertical guiding bars 182 also includes horizontal guiding bars 184. Both forms of gratings 172 are employed in strategic locations along the length of the bridge section 100 and along the horizontally oriented remaining section of the boom 24 (see FIG. 1) to maintain a necessary spacing and control over the multitude of wires W extended between the movement producing mechanism 113 and the stringed puppet 22.

A somewhat different and possible third variation of a wire guiding member is illustrated in FIG. 9 and designated 186 therein. Grating 186 is similar in all essential features of construction to the gratings 172 previously described, and additionally includes an angled mounting leg 188 which mounts the grating 186 to an upstanding tubular frame member 189 at an angle which enables a change in direction of the wires W.

Still referring to FIG. 9 but in conjunction with FIG. 10, it will be seen that mounted on a plate 190 straddling the frame members 174 are a set of two slack control devices, herein generally designated 192. The devices 192 are located between the wire guiding gratings 172 and except for being disposed 180° out of phase with each other are similarly constructed. The first encountered of these slack control devices 192 includes two vertical posts 194 which mount a horizontally oriented mounting plate 196. A vertical bar 198 is extended between the mounting plate 196 and a mounting fixture 200. Pivotally mounted on the bar 198 is a pair of angled brackets 202, 204 which carry a series of spaced vertical guiding bars 206 therebetween. Upper bracket 202 additionally includes a laterally extending operating lever 208 fixedly connected thereto. As is best shown in FIG. 10, connected to opposite ends of lever 208 are wires more particularly designated W6, W7 which are employed to control this slack-control device 192, while the wires W which are employed to produce animation in the stringed puppet 22 are threaded in contact with the vertical guiding bars 206 of said device 192. Let it be assumed that the specifically designated wires W8, W9 of the group of wires W are interrelated in operation, such that wire W8 goes to one point of connection in said stringed puppet 22 while wire W9 goes to an opposite remote point of connection therein. Let it be further assumed that irrespective of the particular position of moving parts that said wires W8, W9 control, that a body or other overt movement in the stringed puppet 22, as for example a turn of the torso of said stringed puppet 22 about its lengthwise axis, requires that slack produced in the wire W8 by this movement be taken-up, and that play-out of slack be provided the wire W9. These slack take-up and play-out movements in the wires W8, W9 are accomplished by operation of the slack-control device 192. By appropriate manipulation of the wires W6, W7, a corresponding rotation is produced in the brackets 202, 204 and in the vertical guiding bars 206 extended therebetween. This movement of the guiding bars 206 for the wires W8, W9 results in what is in effect a pulling manipulation of the wire W8 and a corresponding release or play-out of the wire W9.

The next encountered slack control device, more particularly designated 192a in FIG. 10, will be understood to be similar in all constructional features and also similar in mode of operation to that just described, but is oriented 180° out of phase with the device 192. Thus, whereas the previously described device is functional for sets of wires W8, W9 attached to remote points in a horizontal plane in the stringed puppet 22, the device 192a is similarly functional for sets of wires, such as wires W10, W11, connected to remote points in a vertical plane of the stringed puppet 22. Wires W, not requiring slack control, by-pass both or one or the other of the slack control devices 192 and are threaded through the lower by-pass grating 180.

Figure 11:
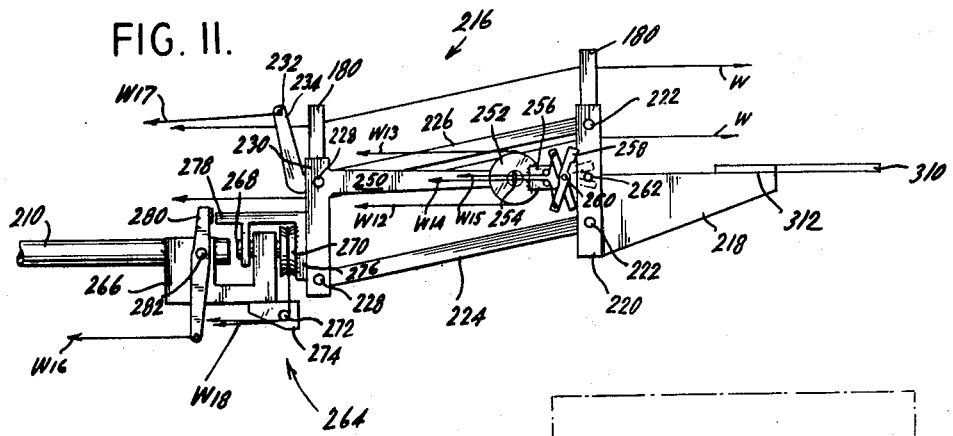
FIG. 11 is a fragmentary elevational view of a lifting mechanism on the end of the boom of said animation device.

Reference is now made to FIGS. 9, 11 which best illustrate details of the construction of the boom 24 and of the connection of the stringed puppet 22 to said boom. More particularly, boom 24 includes a single horizontally oriented tubular member 210 extending from the bridge section 100 through an aperture or opening 212 in the upstanding background scenery 33 advantageously employed to enhance the display of the stringed puppet 22. The boom member 210 is equipped at its free end with a puppet lifting mechanism, generally designated 216 in FIG. 11. Lifting mechanism 216 includes a puppet mounting bracket 218 which actually mounts the puppet 22 and which bracket 218 is provided with a leg 220 pivotally connected at spaced points, as at 222, to a connecting rod 224 and to a wire actuated lever 226. At the spaced points 228, the rod and lever 224, 226 are in turn pivotally connected to a bracket 230 which is actually mounted on the end of the boom member 210. A control wire, more particularly designated W17 in FIG. 11, is connected as at 232 to a leg 234 of the lever 226, and from this point of connection extends, as best seen in FIG. 9, to a guiding sheave 236. Wire W17 is wrapped once about sheave 236 and is then connected to a counterweight 238, connected by an additional length of wire W17 to a motor-operated wind-up spool 240. Connected to the upstanding tubular frame 189 of the boom 24 is a bracket 242 which mounts a motor 244 operating through a conventional gear reduction train 246 to power the spool 240 which is fixedly mounted on the motor drive shaft 248. It will be understood that counterweight 238 is slightly less than the dead weight of the stringed puppet 22 so that this weight produces no lifting movement of the stringed puppet 22. However, when the spool 240 is driven in rotation in a direction which winds up the wire W17, only the difference in weight therebetween need be overcome. Pulling manipulation of the wire W17 results in pivotal movement of the lever 226 about the pivot point 228, and a consequential lifting of said lever at its other end connected to the puppet mounting bracket 218. It is in this manner that gross or overt lifting or raising movement is produced in the stringed puppet 22.

Apart from gross or overt lifting movement in the puppet 22, there is a need for such lifting movement, but to a lesser extent, in order to more realistically portray walking movement in said puppet 22. Thus, with each step, the puppet 22 should be raised slightly to more accurately simulate a "spring" motion inherent in the act of walking. To this end, bracket 230 is provided with a horizontal leg 250 mounting a sheave 252, pivotal at 254. A cooperating set of wires W12, W13 controls the pivotal movement of the sheave 252 which mounts a bracket 256 on which a pair of clamps 258 are pivotally mounted, as at 260. The clamps 258 are closed, by pulling manipulation of wires W14, W15, upon a peg 262 on the puppet mounting structure 220, 218. In order of operation, the clamps 258 are first closed on the peg 262, and the sheave 252 then appropriately pivotally manipulated with each step of the puppet 22 to more realistically simulate said "springing" motion during walking movement of said puppet.

Completing the construction of the boom 24 is a puppet pivoting mechanism, generally designated 264. Mechanism 264 includes a bracket 266 having one leg firmly fixed on the end of the extending frame member 210 of the boom 24 and another leg journalling a shaft 268 on which a pivot control sheave 270 is fixedly mounted. Wires W18 trained about the sheave 270, when manipulated, produce pivotal movement in shaft 268 and sheave 270, said wires W18 being threaded about a guide 272 of a bracket extension 274 of the bracket 266. Such pivotal movement is imparted to the lifting mechanism 216 which is supported on an L-shaped bracket 276 having one leg connected between the sheave 270 and lifting mechanism bracket 230.

A horizontal leg 278 of bracket 276 extends inwardly of the end of the boom frame 210 and is engaged by a wire-actuated braking lever 280 pivotally mounted at 282 on the mounting bracket 266 to prevent accidental or inadvertent pivotal movement of the puppet 22. Wire W16 is connected to so operate said braking lever 280.

Figure 13:
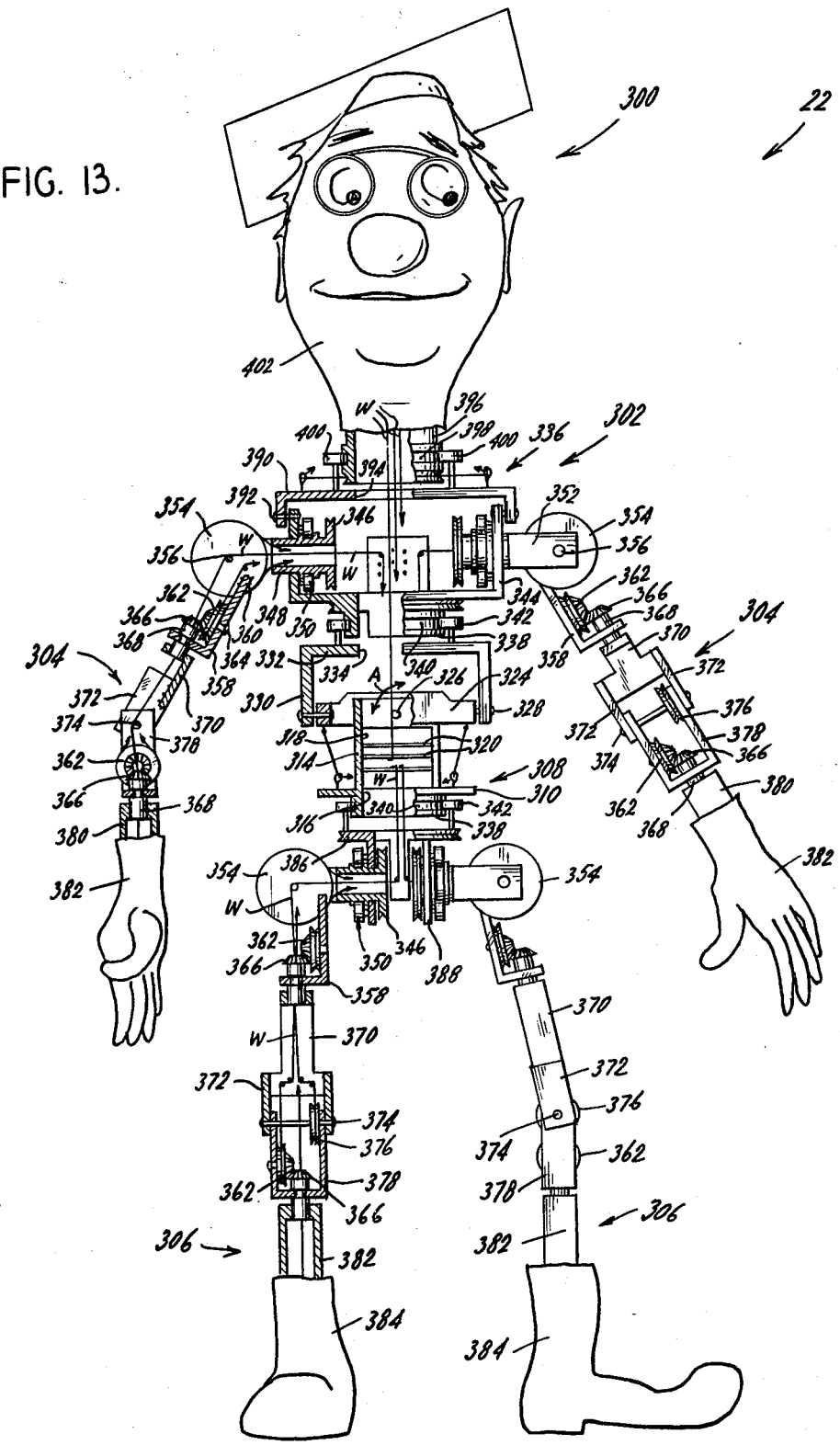
FIG. 13 is a front elevational view of the skeletal body and limb-members of the puppet intended for use with the animation device of FIGS. 1–12.

Reference is now made to FIGS. 13–16 which best show the constructional features of the puppet 22. Referring first to FIG. 13, said puppet 22 as clearly shown therein includes a head 300 mounted on an articulating skeletal body, herein generally designated 302, and limb members consisting of identically constructed arms 304 and legs 306 attached to said articulating body 302. As is best seen by comparing FIG. 13 with FIGS. 14–16, the string-like means or wires W, which as previously explained, are employed in producing animated movements of the puppet 22 are extended along a first course which runs generally parallel to the puppet supporting boom 24 for entry into said puppet 22. As will now be explained in greater detail, said wires W at said point of entry are given a changed direction along a second course which is generally lateral to said direction of entry into said puppet. Returning again to a consideration of FIG. 13, attention is particularly directed to a medial body section 308 of said articulating body 302 which it will be further understood is fixedly mounted to the boom 24 by the connection of a mounting plate 310 thereof being appropriately welded, as at 312 (see FIG. 14) to the mounting bracket 218 of said boom 24. Said stationary medial body section 308 includes a generally cylindrical wall section 314 disposed through a central opening 316 in said plate 310 and having an opening 318 in a rear portion thereof through which the wires W make entry into said skeletal body 302. Suitably supported between the opposing side wall portions of said cylindrical wall section 314 are a plurality of spaced guiding bars 320 about which said wires W are threaded during change from said first directional course of entry into said puppet 22 to said second directional course throughout said puppet body for making connections at plural points along said body and to the limb members 304, 306 connected thereto. As best shown in FIG. 13, said second directional course of the wires W is essentially parallel to the vertical axis of the puppet 22 and moreover is essentially along an internal path through the skeletal body 302 as well as of said limb members 304, 306. Thus an important constructional feature of the skeletal body 320 is the capability of providing an appropriately articulating structure while at the same time accommodating said movement-actuating wires W along an easily hidden, second directional course internally of said puppet 22.

Figure 14:
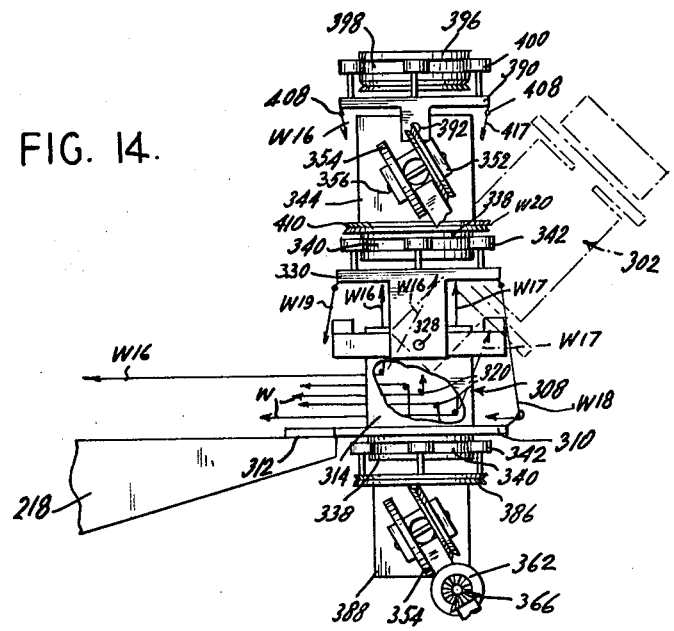
FIG. 14 is a front elevational view of the skeletal body of said puppet, best illustrating the connection of said body to the boom of said animation device and further illustrating, in phantom perspective, a position of movement of said skeletal body.

To the above end, said skeletal body 302 in addition to said stationary medial body section 308 includes plural body sections interconnected one to the other and supported on said medial body section 308 so that relative movement is possible between each of said body sections as well as relative to said supporting medial body section 308. The first of these body sections is formed by a first hollow gimbal member 324 disposed externally about and at the upper open end of the wall section 312 on gimbal pivots 326 connected therebetween and permitting movement of said first gimbal member 324 about the axis of said pivots 326 in the opposite directions indicated by the double-headed reference arrow A. Such pivotal movement will be recognized as providing a degree of movement to the puppet 22 which effectively simulates side bending movements from the waist. Pivotally connected, as at 328, along an axis perpendicular to the axis of said pivots 326 is a second gimbal member 330 having a generally circular plate 332 at an end remote from said pivots 328 and having a central opening 334 therein to accommodate said wires W therethrough. As best shown in FIG. 14, said second gimbal member 330 by virtue of being pivotal about said pivots 328 thus provides a degree of movement to said skeletal body 302 which effectively simulates bending forward (or backwards) from the waist as is illustrated in phantom perspective in said figure.

An additional degree of movement which is required for the skeletal body 302 is rotative movement thereof about the central axis of the puppet 22. Thus, the uppermost portion of the upper torso of the puppet 22, herein generally designated 336, is provided at its lower end with a hollow cylindrical extension 338 having an external circular groove 340 therein cooperating with plural circumferentially spaced rollers 342 mounted on said second gimbal member circular plate 332 and thereby permitting rotative movement of said upper torso body section 336 relative to said second gimbal member 330. Cylindrical extension 338 is formed, more particularly, on a box-like structure 344 which forms the major component of said upper torso body section 336 and to which structure the arms 304 and head 300 are appropriately connected. Since the arms 304 are identically constructed, the same reference numbers identify the same parts of each. Mounted in each of the opposite upstanding side walls of the structure 344 is a sheave 346 having a depending hollow cylindrical body 348 approximately rotatively mounted, as at 350, by cooperating rollers and guide groove structure 342, 340. Said body 348 forms into a mounting bracket 352 at its end extending externally of the torso structure 344. A disc 354 is rotatively mounted, as at 346 on said bracket 352 and in turn mounts an L-shaped bracket 358 which is welded or otherwise appropriately secured at 360 to the face of said disc 354. A combination sheave and bevel gear component 362 is rotatively mounted at 364 in one of the legs of said bracket 358 and is in meshing engagement with a bevel gear 366 provided on an end of a cylinder 368 rotatively mounted in the other leg of the bracket 358. The opposite end of the cylinder 368 mounts a bracket 370 having bifurcated legs 372. Pivotally mounted on a pin 374 which also fixedly mounts a sheave 376, is a U-shaped bracket 378 which similarly mounts a sheave and bevel gear 372 in meshing engagement with a bevel gear and cylinder 366, 368. Completing the construction of each arm 304 is a hand-simulating member 380 attached to said cylinder 368 and provided with a glove 382. From the foregoing description, it should be readily appreciated that each arm 304 has a considerable degree of articulating movement, including pivotal movement at points 356 and 374, and rotative movement at points 350 and 368.

Having reference now to the construction of each of the legs 306, it will be noted that said limb members are markedly similar in construction to each of the arms 304 and thus a duplicated constructional feature has been designated with the same reference number. Thus, each of said legs 306 at its point of connection to said skeletal body 302 includes a horizontally oriented sheave 346 rotatively mounted, as at 350, and in turn mounting a rotatable disc 354. Between said disc 354 and a foot-simulating member 382 covered in practice with a shoe 384, each of said legs 306 is constructed of members and components closely resembling those already described in connection with the arms 304, such components and parts including for example the brackets 358, 370 and 378, as well as meshing bevel gears 382, 366 and a pivot axis 374 at a simulated knee joint. Advantageously, said legs 306 are connected to said medial body section 308 in a manner permitting rotative movement of the legs about the central axis of the puppet 22. To this end there is provided a cylindrical extension 338 below said mounting plate 310 and having a peripheral groove 340 therein cooperating with rollers 342. Said rollers 342 are in turn circumferentially mounted about a circulate plate 386 having a dependent cylindrical section 388 provided with side openings for mounting the cylindrical body of each of said sheaves 346.

Completing the construction of said puppet 22 is structure for pivotally mounting the head 300 thereof while at the same time permitting rotative movement thereof. Such structure includes a bracket 390 pivotally mounted at opposite ends, as at 392, to the upper ends of said box-like structure 344 and having a central opening in alignment with the opening of a cylindrical neck-simulating member 396 forming a lower portion of said head 300. A circular guide groove 398 is provided in said neck member 396 and cooperates with a plurality of circumferentially spaced rollers 400 provided about said central opening 394. Above said guide groove 398, the puppet head 300 is provided with a face-simulating covering 402 fabricated of elastomeric or other flexible material which permits movement of mechanisms located internally of said head 300. Thus, for example the puppet 22 may advantageously be provided with movable jaws for simulating talking, or with eye-movement mechanisms for better simulating facial expressions, all to the end of complementing the animated movements produced in the body and limb members of said puppet 22.

Figure 15:
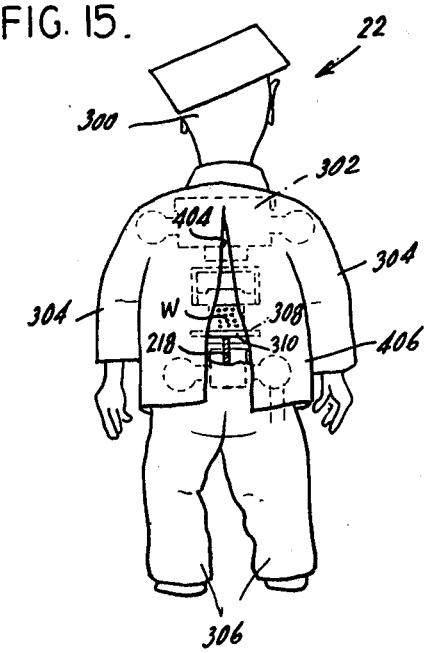
FIG. 15 is a rear elevational view of said puppet.
Figure 16:
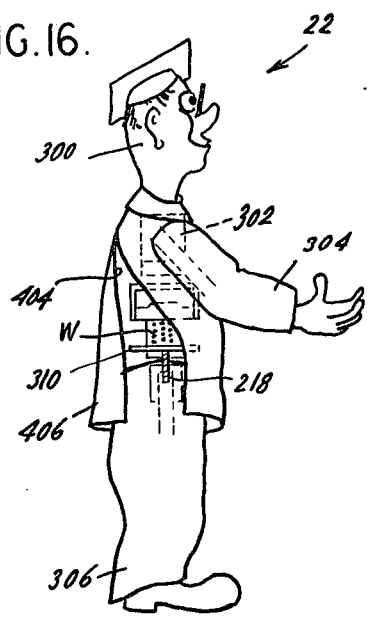
FIG. 16 is a profile view of said puppet.

Still referring primarily to FIG. 13, but in conjunction with FIGS. 14–16, it will thus be understood from the foregoing description that the medial body section 308 by virtue of being fixedly mounted on the mounting plate 218 of the boom 24 has no degree of movement independent of the movement of said boom 24. Thus, as best shown in FIG. 14 said body section 308 efficiently serves as a conduit for receiving the wires W extended thereto along a first directional course and present stationary guiding bars 320 laterally of said first directional course and in a position for advantageously changing the direction of said wires W to a second directional course which is in opposite directions along the length of the skeletal puppet body 302. Moreover, as best shown in FIGS. 15, 16, the fact that said medial body section 308 does not have movement independent of the supporting boom 24 does not in any way adversely limit the action which can realistically be simulated by puppet animation. More particularly, puppet 22 will be understood to be depicted in FIG. 15 in the position it would have at the end of the boom 24 while directly facing the camera 30. In this position, the wires W entering into said puppet 22 are illustrated as dots since said wires W are oriented substantially perpendicular to the plane of FIG. 15. In being threaded into said puppet 22 said wires W pass through a slot 404 provided in the rear of a coat 406 which is advantageously placed over the upper torso of said puppet 22 to hide the skeletal body 302 of said puppet. Assuming now that the script of the action being filmed requires a profile shot of said puppet 22, as is depicted in FIG. 16, this is readily accomplished despite the stationary character of the medial body section 308 by causing rotative movement of the legs 306 at said rotative connection 340, 342, simultaneously with rotative movement of the upper torso body 336 at the rotative connection 340, 342, as well as rotation of the head 300 at its rotative connection 398, 400. All that occurs, is that a twist is produced in the coat 406 to the extent of the rotative movement of the aforesaid mentioned parts relative to the stationary medial body section 308. However, since the camera 30 is on the side of said puppet 22 opposite from the coat slot 404 as shown in FIG. 16, there is no telltale indication in view of said camera detracting from said FIG. 16 profile view of the puppet 22.

It should be readily understood how manipulation of the wires W connected at plural points throughout said skeletal body 302 and also throughout said limb members 304, 306 produces movements in accordance with the degrees of articulation provided the plural sections of said body 302 and of said limb members 304, 306. For completeness sake, however, operative connections of certain of the wires W are more particularly shown in FIG. 14 and will be understood to be exemplary of the manner in which said operative connections are made throughout the entire puppet structure to produce animated movements in said puppet 22 hereof. Consider first the wires more particularly designated W16, W17 which constitute a cooperating set of wires in that together they control what may aptly be termed "nodding" movement of the puppet head 300. Said wires W16, W17 are initially trained about the guiding bars 320 of the stationary medial body section 308 and extend internally through said skeletal body 302 through the central openings provided in all of the body sections or members, including the first and second gimbal members 324, 330 and said box-like structure 344, for making an operative connection as at 408, at a central location on the front and rear edges of the head mounting bracket 390. Upon pulling manipulation of wire W17 simultaneously with play-out of wire W16 a forward nodding movement will be produced in the puppet head 300 about the pivot axis 392 in an obvious manner. By the same token, appropriate control may be exercised over the wires W16, W17 to maintain the head 300 in a stabilized, in-line or erect position as depicted in FIG. 13. Moreover, said erect FIG. 13 position for the puppet head 300 can be maintained despite over overt body movements of said puppet, such as for example a full bending movement at the waist as depicted in phantom perspective in FIG. 14. Unavoidably, such forward bending movement of the skeletal body 302, as is produced by pulling manipulation of the wire W18 simultaneously with appropriate play-out of the cooperating wire W19 thereby producing pivotal movement of the second gimbal member 330 about its pivot axis 328, must affect the condition of the wires W16, W17. More particularly, the forward tilting movement of the skeletal body 302 will unavoidably produce slack in the wire W17 while requiring some play-out of the wire W16 in order not to restrict said forward tilting movement. An appropriate adjustment for such overt movements is contemplated in the present invention and provided by the mode of operation of the previously described slack-control devices 192. Each of these devices is effective to take-up and play-out slack in the wires W, such as is exemplified specifically by the cooperating set of wires W16, W17 in FIG. 14 (and wires W8, W9 of FIG. 10 and wires W10, W11 of FIG. 9) in accordance with the demands of the overt body movements of the puppet 22. Apart from the operative connections 408 established for the wires W on pivotally mounted body members, an appropriate number of said wires W are arranged to produce rotative movements, such as is exemplified by the wire W20 trained about a sheave 410 for producing rotative movement when manipulated, of the body section 336 to which said sheave is an integral part. Thus, the plural operative connections for the wires W include connections to both pivotally and rotatively mounted body sections, wherein tilting and rotative movements in the movable parts of said puppet as well as combination or compound movements thereof are produced by appropriate wire manipulation, all to the end of realistically producing animation of the puppet 22.

Figure 12:
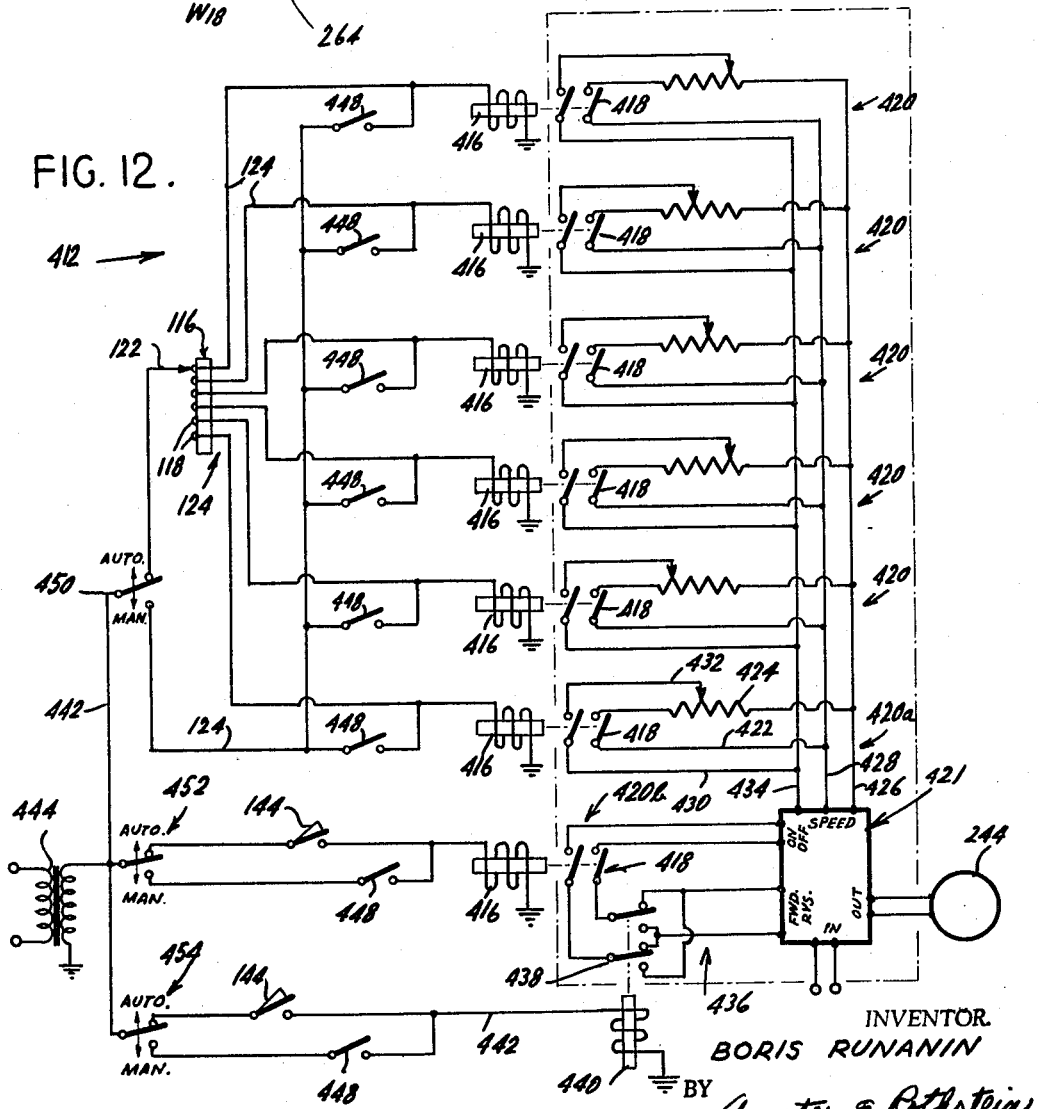
FIG. 12 is a diagrammatic exemplary control circuit diagram for the motors employed in the operation of said animation device.

Not only does the present invention contemplate the aforesaid constructional features for producing practically any degree of movement in said puppet 22, but means are also provided for controlling the tempo or speed of such movements. In this connection, attention is directed in particular to FIG. 12 wherein an exemplary circuit diagram is illustrated for controlling motor speed as well as motor direction of rotation. In the embodiment of the automation device 20 described herein, there are a total of four motors employed in the operation of such device, namely a cam bank powering motor 92, a first carriage powering motor 88, a dolly powering motor 62, and a puppet lifting motor 244, all of which motors will be understood to have an associated controlling circuit such as is illustrated in FIG. 12. For purposes of description, said circuit will be described in particular connection with the puppet lifting motor 244. Each of said circuits, generally designated 412, is further associated with an electrical component 116, such as was previously described in connection with FIGS. 5, 6, and which component includes a series of contacts 118 having an individual connection, as by a conductor 124, to a solenoid winding herein collectively designated 416. Each of said solenoids 416 in turn are associated with and are effective to operate a circuit-completing switch, herein collectively designated 418, of one of seven sub-circuits 420 of a motor control unit 421 for said puppet lifting motor 244. Said motor control unit 421 may be similar to the commercial unit identified as C25 motor controller which is produced by the Gerald K. Keller Company of Las Vegas, Nev. Such a unit has conventional electrical circuitry therein for effecting control over both the speed and the direction of rotation of the motor 244. In this connection, attention is directed to the one of said sub-circuits designated 420a which is exemplary of such circuitry effecting control over the speed of rotation of said motor 244. Sub-circuit 420a includes a first conductor 422 which in turn includes a potentiometer 424 and is connected across the common conductors 426, 428 applying power across said potentiometer 424. Additionally, said sub-circuit 420a includes a second conductor 430 including the tap-off 432 of said potentiometer and connected across common conductor 426 and the third conductor 432 of the three wire connection to said control unit 421 and which conductors will be understood to have a connection to the winding of said motor 244. Thus, depending upon the location of the tap-off 432 along the length of the potentiometer 424, only a portion of the full voltage applied across said potentiometer 424 is applied through said second conductor 430 across the motor winding to produce an appropriate speed of rotation of said motor. In this connection, it will be noted that the location for each of the tap-off pointers 432 of the seven sub-circuits 420 differs from each other to thereby provide the necessary variation in the speed of rotation of said motor to in turn produce puppet animation movements at a tempo or speed as desired.

Circuit 412 is also effective to control the direction of rotation of the motor 244. This additional feature is under the control of the sub-circuit more specifically designated 420b. Sub-circuit 420b includes a conventional reversing circuit 436 connected to the control unit 421 and presenting two sets of contacts to a switch 438 connected in series with the circuit-completing switch 418 of said sub-circuit 420. Switch 438 is under the control of a solenoid 440 in the main power conductor 442 of the circuit 412 and completes a circuit through one or the other of the two sets of contacts of the sub-circuit 436 to provide in a conventional and well understood manner either clockwise or counter-clockwise rotation of the motor 244. Thus, assuming that power is applied across the primary coil of a transformer 444, an appropriate portion of such power is delivered via the connection of the secondary coil of said transformer 444 through the lower branch of the main power conductor 442 to said solenoid 440 which has the capability, as just described, of actuating the switch 438. However, such switch actuation occurs only when either the cam-actuated switch 144 or the conventional manually actuated switch 448 is actuated to complete said lower branch circuit 442. The energizing circuit of the solenoid 416 associated with the circuit-completing switch 418 of the sub-circuit 420b is similarly provided with a cam-actuated switch 144 and a manual switch 448. In fact, all of the energizing circuits for the solenoids 416 should, in accordance with good design practice, be provided with a least a manually actuated switch 448 as illustrated in FIG. 12.

Completing the circuit 412 of FIG. 12 are main switches 450, 452, and 454 which each function to selectively provide either automatic operation of said circuit or manual operation thereof. For example, in the position of the main switch 450 illustrated in FIG. 12, a power circuit from the transformer 444 is completed through the upper branch circuit 442, through said switch 450, and through the pointer 122 to whichever one of the contacts 118 is engaged by said pointer and through a conductor 124 for energizing the circuit of one of the solenoids 416. When, however, said main switch 450 is placed into its manual position, it is readily apparent that the electrical component 116 is bypassed in favor of a direct connection to a common conductor 456 of the energizing circuits for the solenoids 416. Under this condition, it is necessary to close one of the manual switches 448 in order to complete one of said solenoid energizing circuits. Main circuit switch 452 provides either automatic or manual control over the "on-off" condition of the motor 244, said automatic control being achieved through the cam-actuated switch 144 while manual control is achieved through a by-pass circuit including the manual switch 448. Main circuit switch 454 is essentially similar in mode of operation to switch 452 but is associated with solenoid 440 having the capability of controlling the direction of motor rotation through the sub-circuit 436.

From the foregoing description of the automation device 20 and of the stringed puppet 22 supported and manipulated through animated movements by said device 20, it should be appreciated that said device and puppet represent a noteworthy and important technical development in the production of animated cartoons and the like. The animated movements produced in said puppet 22 by said automation device 20 are practically limitless and carried out with such a degree of realism and with absolutely no trace of the presence of said automation device 20, that action film sequences of the puppet 22 are markedly superior to any comparable films produced by other methods or devices now known.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. The combination with a puppet having movable parts and strings connected to said movable parts for producing animation of said puppet of an animation device for producing mechanical manipulation of said strings, said animation device comprising a boom for supporting said puppet on one end thereof, a dolly mounting the other end of said boom and means for moving said dolly through a path limited to rotation about a remote vantage point for viewing said puppet, a movement-producing mechanism carried by said dolly and having a connection with said strings of said puppet, and means carried on said boom for guiding and for maintaining said strings taut between said movement-producing mechanism and said puppet.

2. The combination with a puppet having movable parts and strings connected to said movable parts for producing animation of said puppet of an animation device for producing mechanical manipulation of said strings, said animation device comprising a boom for supporting said puppet on one end thereof, a dolly mounting the other end of said boom and means for moving said dolly through a path limited to rotation about a remote vantage point for viewing said puppet and in opposite directions toward and away from said remote vantage point, a movement-producing mechanism carried by said dolly including a carriage means mounted for movement along said dolly, a bank of cams carried on said carriage means, and cam-actuated lever means having a connection at one end with said strings of said puppet and said other end located in the path of movement of said bank of cams for being actuated by contact with said bank of cams, and means on and along said boom for guiding and for maintaining said strings taut between said lever means and said puppet.

3. The combination with a puppet having movable parts and strings connected to said movable parts for producing animation of said puppet of an animation device for producing mechanical manipulation of said strings, said animation device comprising a boom for supporting said puppet at one end thereof, means mounting the other end of said boom including a dolly, arcuate track means for said dolly defining a path of movement limited to rotation about a remote vantage point for viewing said puppet, and carriage means on said dolly for moving said boom in opposite directions along said dolly toward and away from said remote vantage point, a movement-producing mechanism carried by said dolly and having a connection with said strings of said puppet, and means on and along said boom for guiding and for maintaining said strings taut between said movement-producing mechanism and said puppet.

4. The combination with a puppet having movable parts and strings connected to said movable parts for producing animation of said puppet of an animation device for producing mechanical manipulation of said strings, said animation device comprising a boom for supporting said puppet on one end thereof, means mounting the other end of said boom including a dolly, arcuate track means for said dolly defining a path of movement limited to rotation about a remote vantage point for viewing said puppet, and first carriage means on said dolly for moving said boom in opposite directions along said dolly toward and away from said remote vantage point, a movement-producing mechanism carried by said dolly including a second carriage means mounted for movement along said dolly, a bank of cams carried on said second carriage means, and cam-actuated lever means having a connection at one end with said strings of said puppet and said other end located in the path of movement of said bank of cams for being actuated by contact with said bank of cams, and means on and along said boom for guiding and for maintaining said strings taut between said lever means and said puppet.

5. The combination with a puppet having movable parts and strings connected to said movable parts for producing animation of said puppet of an animation device for producing mechanical manipulation of said strings, said animation device comprising a boom for supporting said puppet at one end thereof, means mounting the other end of said boom including a dolly, arcuate track means for said dolly defining a path of movement limited to rotation about a remote vantage point for viewing said puppet, and carriage means on said dolly for moving said boom in opposite directions along said dolly toward and away from said remote vantage point, a movement-producing mechanism carried by said dolly and having a connection with strings of said puppet, and means located on said boom including at least two slack-control members through which said strings are threaded for being guided and for being maintained taut between said movement-producing mechanism and said puppet.

6. The combination with a puppet having movable parts and strings connected to said movable parts for producing animation of said puppet of an animation device for producing mechanical manipulation of said strings, said animation device comprising a boom for supporting said puppet on one end thereof, means mounting the other end of said boom including a dolly, arcuate track means for said dolly defining a path of movement limited to rotation about a remote vantage point for viewing said puppet, and carriage means on said dolly for moving said boom in opposite directions along said dolly toward and away from said remote vantage point, a movement-producing mechanism carried by said dolly and having a connection with said strings of said puppet, and at least two slack-control members on said boom and disposed 180° out of phase with each other, each of said slack-control members including spaced guiding means in contact with said puppet strings and means for rotating said guiding means relative to said puppet strings for drawing-up on some of said strings while simultaneously easing-up on other of said strings to thereby permit movement of said puppet while maintaining all strings taut between said movement-producing mechanism and said puppet.

7. The combination with a puppet having movable parts and strings connected to said movable parts for producing animation of said puppet of an animation device for producing mechanical manipulation of said strings, said animation device comprising a boom for supporting said puppet on one end thereof, means mounting the other end of said boom including a dolly, arcuate track means for said dolly defining a path of movement limited to rotation about a remote vantage point for viewing said puppet, and first carriage means on said dolly for moving said boom in opposite directions along said dolly toward and away from said remote vantage point, a movement-producing mechanism carried by said dolly including a second carriage means mounted for movement along said dolly, a bank of cams carried on said second carriage means, and cam-actuated lever means having a connection at one end with said strings of said puppet and said other end located in the path of movement of said bank of cams for being actuated by contact with said bank of cams, and at least two slack control members on said boom and disposed 180° out of phase with each other, each of said slack-control members including spaced guiding means in contact with said puppet strings and means for rotating said guiding means relative to said puppet for drawing-up on some of said strings to thereby permit movement of said puppet while maintaining all strings taut between said lever means of said movement-producing mechanism and said puppet.

8. The combination with a stringed puppet having movable parts of an animation device for producing mechanical manipulation of said puppet strings, said animation device comprising a boom for supporting said stringed puppet on one end thereof, a dolly mounting said boom and means for moving said dolly through a path limited to rotation about a remote vantage point for viewing said puppet, a movement-producing mechanism carried by said dolly and having a connection with said strings of said puppet, and means carried on said boom for guiding and for maintaining said strings taut between said movement-producing mechanism and said puppet, and said stringed puppet including a skeletal body having a hollow medial body section fixedly mounted on said end of the boom and receiving said puppet strings therein, guide means carried on said medial body section and effective to distribute said strings for operative connections throughout said skeletal body, and plural body sections and mounting means for supporting the same on said medial body section so as to permit articulating movement of said body sections relative to each other and to said medial body section, each of said body sections having a central opening and disposed along the path of said puppet strings such that said central openings are in registration with each other for accommodating the threading of said strings throughout said skeletal body.

9. The combination with a stringed puppet having movable parts of an animation device for producing mechanical manipulation of said puppet strings, said animation device comprising a boom for supporting said stringed puppet on one end thereof, means mounting the other end of said boom including a dolly, arcuate track means for said dolly defining a path of movement limited to rotation about a remote vantage point for viewing said puppet, a movement-producing mechanism carried by said dolly and having a connection with said strings of said puppet, and means carried on said boom for guiding said strings in a taut condition, along a first course to said puppet, and said stringed puppet including a skeletal body having a hollow medial body section fixedly mounted on said end of the boom, guide means carried on said medial body section and extending laterally of said puppet strings threaded into said puppet and effective to change the direction of said strings to a direction extending along said skeletal body for achieving plural operative connections to said body, and plural body sections and mounting means for supporting the same on said medial body section so as to permit articulating movement of said body sections relative to each other and to said medial body section, each of said body sections having a central opening and disposed along the path of said puppet strings such that said central openings are in registration with each other for accommodating the threading of said strings throughout said skeletal body.

References Cited

UNITED STATES PATENTS 2,466,214   5/1949   Deaton _____ 46—126

LOUIS G. MANCENE, *Primary Examiner.*

RICHARD C. PINKHAM, *Examiner.*

R. F. CUTTING, *Assistant Examiner.*